United States Patent
Menezes et al.

(10) Patent No.: US 7,159,983 B2
(45) Date of Patent: Jan. 9, 2007

(54) MULTIFOCAL LENSES FOR PRE-PRESBYOPIC INDIVIDUALS

(75) Inventors: Edgar V. Menezes, Roanoke, VA (US); Pierre Y. Gerligand, Fincastle, VA (US)

(73) Assignee: Essilor International (Compagnie Generale d'Optique) (FR)

( * ) Notice: Subject to any disclaimer, the term of this patent is extended or adjusted under 35 U.S.C. 154(b) by 47 days.

(21) Appl. No.: 10/978,165

(22) Filed: Oct. 29, 2004

(65) Prior Publication Data

US 2006/0092375 A1   May 4, 2006

(51) Int. Cl.
G02C 7/02 (2006.01)
G02C 7/06 (2006.01)

(52) U.S. Cl. .................. 351/177; 351/168; 351/178

(58) Field of Classification Search ........... 351/168, 351/177

See application file for complete search history.

(56) References Cited

U.S. PATENT DOCUMENTS

| | | | | |
|---|---|---|---|---|
| 5,715,032 A | * | 2/1998 | Isenberg ................ 351/169 |
| 6,000,798 A | * | 12/1999 | Chipman et al. ........ 351/176 |
| 6,106,118 A | * | 8/2000 | Menezes et al. ........ 351/169 |
| 2005/0122470 A1 | * | 6/2005 | Perrott et al. .......... 351/159 |

* cited by examiner

*Primary Examiner*—Jordan Schwartz
*Assistant Examiner*—Jessica Stultz
(74) *Attorney, Agent, or Firm*—Fish & Richardson P.C.

(57) ABSTRACT

The invention provides lenses suitable for use by pre-presbyopic individuals. The lenses of the invention have one or more non-conic, aspheric surfaces having substantially no noticeable unwanted astigmatism.

22 Claims, 4 Drawing Sheets

MULTIFOCAL LENSES FOR PRE-PRESBYOPIC INDIVIDUALS

FIELD OF THE INVENTION

The present invention relates to multifocal ophthalmic lenses. In particular, the invention provides non-conic, aspheric lenses for pre-presbyopic individuals.

BACKGROUND OF THE INVENTION

Single vision lenses are routinely used to correct myopia, hyper-emetropia and astigmatism in wearers that are typically below 40 years of age. Above this age and with the onset of presbyopia, multifocal ophthalmic lenses such as bifocals, trifocal and progressive addition lenses ("PALs") are used for the treatment of presbyopia. In the age range of 30 to 40 years, individuals' near vision may be deteriorating, but they usually have sufficient residual accommodation to be able to focus for intermediate and near tasks without lenses correcting their near and intermediate visual acuity. However, under low light conditions or for carrying out intermediate and near vision tasks for extended periods of time, these individuals find that some additional magnification is helpful to reduce eye strain.

BRIEF DESCRIPTION OF THE DRAWINGS

FIG. 1b is a power contour map of the lens of FIG. 1a.

FIG. 2b is a power contour map of the lens of FIG. 2a.

FIG. 3b is a power contour map of the lens of FIG. 3a.

FIG. 4a is a cylinder contour map of the unwanted astigmatism of a second lens of the invention.

FIG. 4b is a power contour map of the lens of FIG. 4a.

DESCRIPTION OF THE INVENTION AND ITS PREFERRED EMBODIMENTS

Figure 1A:
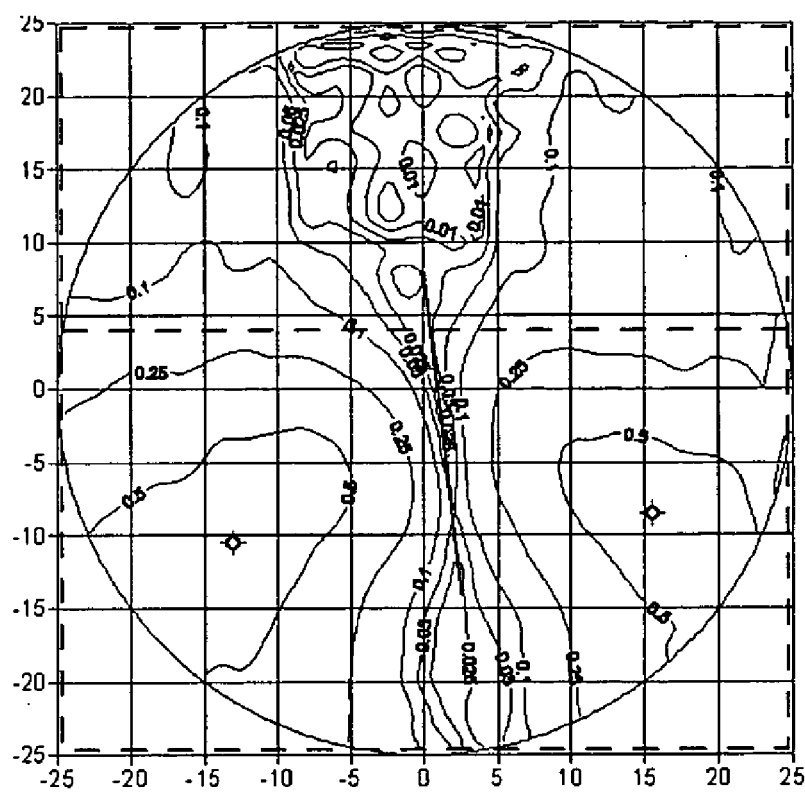
FIG. 1a is a cylinder contour map of the unwanted astigmatism of a first prior art progressive addition lens.
Figure 1B:
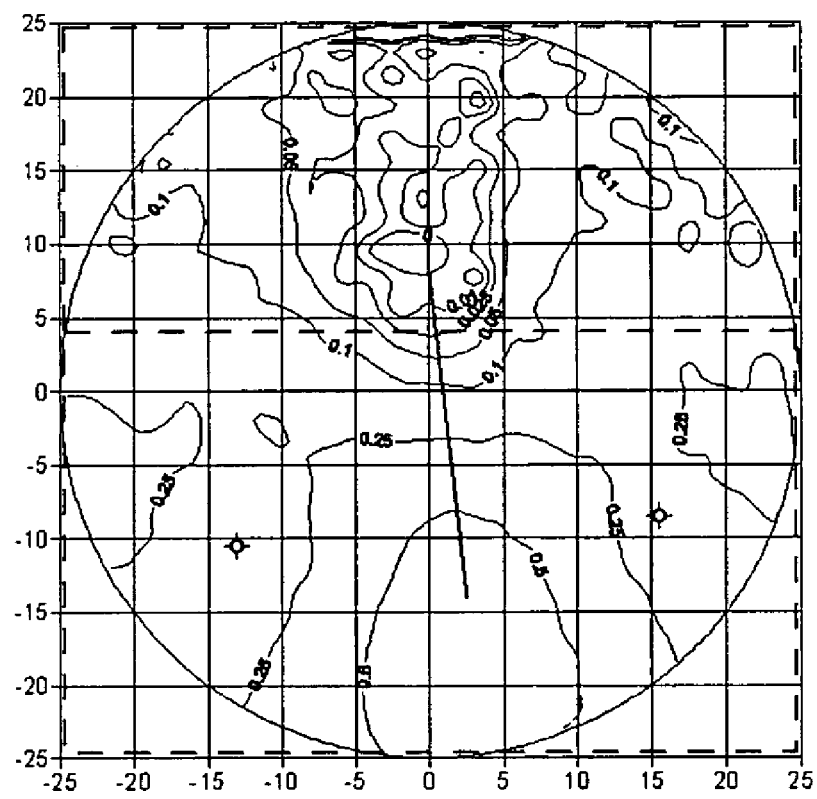

The present invention provides lenses, and methods for their design and manufacture, which are suitable for use by pre-presbyopic individuals. By "pre-presbyope" or "pre-presbyopic individual" is meant a person whose near vision acuity is diminishing, but who does not yet need near vision correction of more than about 0.75 diopters. The lenses of the invention are non-conic, aspheric lenses having substantially no noticeable unwanted astigmatism. These lenses are provided by applying localized alterations to a progressive addition surface.

In one embodiment, the invention provides a method for designing a lens, comprising, consisting essentially of, and consisting of: a.) designing a first surface that is a progressive addition surface $P(x,y)$ using a base spherical surface $P_s(x,y)$; b.) expressing the first surface $P(x,y)$ as a plurality of sag values $P_o(x,y)$; c.) altering locally one or more of the plurality of sag values $P_o(x,y)$ to provide a second surface $N(x,y)$; d.) adding the second surface $N(x,y)$ to the base spherical surface $P_s(x,y)$ to obtain a non-conic aspheric surface having a maximum unwanted astigmatism between about 50% and 60% of the non-conic surface's add power. In another embodiment, the invention provides lenses made in accordance with this method.

By "lens" is meant any ophthalmic lens including, without limitation, a spectacle, contact, intraocular lens and the like. Preferably, the lens of the invention is a spectacle lens. By "sag value" is meant the absolute value of the z-axis distance between a point on a surface located at coordinates (x, y) and a corresponding point on a reference plane. For purposes of the invention, the z-axis is the axis orthogonal to the x-y plane.

By "non-conic, aspheric surface" is meant a continuous, aspheric surface having zones for distance and near viewing, and a zone of increasing dioptric power connecting the distance and near zones wherein the surface's add power is between about 0.25 diopters and 0.75 diopters and the maximum, unwanted astigmatism of the surface is less than or equal to about 0.5 diopters. One ordinarily skilled in the art will recognize that, if the non-conic, aspheric surface is the convex surface of the lens, the distance vision zone curvature will be less than that of the near zone curvature and if the non-conic, aspheric surface is the lens' concave surface, the distance curvature will be greater than that of the near zone.

By "unwanted astigmatism" is meant astigmatism that is undesirable and is introduced or caused by the lens surface and is located anywhere on the portion of the lens' surface that is accessed by the wearer's eye when the wearer is viewing distant, intermediate, or near objects. Typically, an individual will experience image distortions that are noticeable when the unwanted astigmatism is greater than about 0.50 diopter.

In the first step of the method of the invention, a first progressive addition surface is provided by any convenient optical design method. The surface, $P(x,y)$ may be a progressive surface or a surface that is the result of combining one or more progressive and regressive surfaces. By "progressive surface" or "progressive addition surface" is meant a continuous, aspheric surface having zones of distance and near vision and a zone of increasing dioptric power connecting the distance and near zones wherein the surface's add power is greater than about 0.75 diopters and the maximum, unwanted astigmatism is greater than about 0.5 diopters. If the progressive surface is the convex surface of the lens, the distance zone curvature will be less than that of the near zone and if the progressive surface is the lens' concave surface the distance curvature will be greater than that of the near zone. By "regressive surface" is meant a continuous, aspheric surface having zones of distance and near vision and a zone of decreasing dioptric power connecting the distance and near zones and wherein the surface's add power is greater than about 0.75 diopters and the maximum, unwanted astigmatism is greater than about 0.5 diopters. If the regressive surface is the convex surface of the lens, the distance zone curvature will be greater than that of the near zone and if the regressive surface is the lens' concave surface the distance curvature will be less than that of the near zone.

In carrying out the method of the invention, designing of the first progressive surface, $P(x,y)$, preferably is carried out using a method that divides the surface into a number of sections and provides a curved surface equation for each area as disclosed, for example, in U.S. Pat. No. 5,886,766 incorporated herein in its entirety by reference. Optimization of the surface may be carried out by any convenient method. Additional properties of a specific lens wearer may be introduced into the design optimization process including, without limitation, variations in the pupil diameter of about 1.5 to about 7 mm, image convergence at a point about 25 to about 28 mm behind the front vertex of the surface, pantoscopic tilt of about 7 to about 20 degrees and the like, and combinations thereof.

The distance and near vision powers for the progressive surface design are selected so that powers of the lens are those needed to correct the lens wearer's visual acuity. The dioptric add power for the surfaces will typically be about +0.25 to about +0.75 diopter, preferably between +0.50 to about +0.75 diopter, and most preferably 0.63 diopter. Generally, the distance curvature of the progressive surfaces will be within about 0.25 to about 8.50 diopters.

The first progressive surface, P(x, y), is then expressed as a plurality of sag values. The sag values are calculated by subtracting P(x,y) from the base spherical surface $P_s(x, y)$, with a curvature equal to the distance curvature or base curvature, to yield the surface's sag values $P_o(x,y)$. One or more of the plurality of sag values are then locally altered to yield a non-conic surface N(x,y) using the equation:

$$N(x, y) = P_o(x, y) + A(x, y) \cdot W(x, y) \quad (I)$$

wherein A is an altering function; and
W is a weighting function.

In the next step, non-conic aspheric surface N(x,y) is added to base spherical surface $P_s(x, y)$ to yield the altered non-conic, aspheric surface of the invention.

Several types of weighting functions, W may be used. Selection of the weighting function to be used will depend upon the location, size and shape of the area to be altered. The portion of the optic to be altered may be centrally or peripherally located and may be a localized or broad area of a given shape, such as a ring-shaped area.

One convenient form for W is:

$$W(x, y, X_0, Y_0, \sigma_x, \sigma_y, \rho) = \quad (II)$$
$$\mathrm{Exp}\left(-\left[\left(\frac{x-X_0}{\sigma_x}\right)^2 - 2\cdot\rho\cdot\left(\frac{x-X_0}{\sigma_x}\right)\cdot\left(\frac{y-Y_0}{\sigma_y}\right) + \left(\frac{y-Y_0}{\sigma_y}\right)^2\right] \bigg/ (2\cdot(1-\rho^2))\right)$$

wherein, $X_0$ and $Y_0$ correspond to the coordinates where the alteration is going to be maximal:

$\sigma_x$ and $\sigma_y$ are the standard deviations of the x and y values of the distribution; and $\rho$ is the correlation coefficient between x and y values.

In Equation II, the form I such that W will equal 1.0 at $x=X_o$ and $y=Y_o$ and decays to zero at values of x and y as one moves away from $X_o$ and $Y_o$. Thus, when W is multiplied by A in Equation I, the alteration is maximal at $Y_o$ and $Y_o$. Additionally, the standard deviations $\sigma_x$ and $\sigma_y$ control the spread of the weighting function. If $\sigma_x = \sigma_y$, the weighting function is symmetric about the x and y axes. Preferably, large values of $\sigma_x$ and $\sigma_y$ are used to enable smooth gradients in the transition area.

Many different alteration functions may be used to change the progressive surface depending on the needs the design must fulfill and, thus, the alteration function selected will depend upon the type of alterations desired to be made to the surface and the location at which the alteration is to be made. The combined use of he weighting and altering function ensures a smooth blending of the altered and unaltered portions of the optic. Examples of suitable functions include, without limitation, the following.

For a toric surface:

$$A_{Toric}(x, y, r_1, r_2, \theta) = \sqrt{\left[\sqrt{r_2^2 - Y_o^2} + r_1 - r_2\right]^2 - X_o^2} + r_1 \quad (III)$$

wherein $X_o = x.\mathrm{Cos}\,\theta - y.\mathrm{Sin}\,\theta$;
$Y_o = y.\mathrm{Cos}\,\theta - x.\mathrm{Sin}\,\theta$;
$r_1$ is the large radius of curvature;
$r_2$ is the small radius of curvature; and
$\theta$ is the orientation of the large axis.

For an atoric surface:

$$A_{Toric}(x, y, r_1, r_2, \theta) = \sqrt{\left[\sqrt{r_2^2 - Y_0^2} + r_1 - r_2\right]^2 - X_0^2} + r_1 \quad (III)$$

wherein $X_o = x.\mathrm{Cos}\,\theta - y.\mathrm{Sin}\,\theta$;
$Y_o = y.\mathrm{Cos}\,\theta - x.\mathrm{Sin}\,\theta$;
$r_1$ is the large radius of curvature;
$r_2$ is the small radius of curvature;
$\theta$ is the orientation of the large axis;
$A_i$ is an aspheric term; and
$S^2 = x^2 + y^2$.

For an aspheric surface:

$$A_{Aspheric}(x, y) = \frac{c \cdot S^2}{1 + \sqrt{1 - (K+1) \cdot c^2 \cdot S^2}} + A_1 \cdot S^4 + A_2 \cdot S^6 + A_3 \cdot S^8 + A_4 \cdot S^{10} \quad (V)$$

wherein c is the inverse radius of curvature;
$S^2 = x^2 + y^2$;
K is a conic constant; and
$A_i$ is an aspheric term.

In an optional, and preferred, final step of the method of the invention, the resulting surface may be smoothed by any suitable fitting technique to eliminate curvature discontinuities that result in localized power changes of greater than about 0.05 diopters. Any known technique may be used including, without limitation, fitting using polynomial, splines and the like. Preferably, the alteration and weighting functions are selected so that any discontinuities introduced into the resultant surface can be smoothed.

The resulting non-conic, aspheric surface will not change substantially from the first surface in the distance, near or prism powers provided the alteration is performed within the constraints outlined above. However, if significant changes do occur, appropriate compensations in power may be incorporated into a complementary surface of the lens to offset the changes. Accordingly, other surfaces designed to adapt the lens to the ophthalmic prescription of the lens wearer may be used in combination with, or addition to, the optimized non-conic, aspheric surface. Additionally, the individual surfaces of the lens may have a spherical or aspherical distance vision zone. Further, combinations of any of the above variations may be used.

In a preferred embodiment, the lens of the invention has as its convex surface the surface of the invention and a complementary concave surface, which concave surface corrects the wearer's astigmatism and prism. The convex surface preferably has a channel length of about 10 to about 22 mm. The surface has an aspherical distance zone which is aspherized to provide additional plus power to the surface of up to about 2.00 diopters, preferably up to about 1.00 diopters, more preferably up to about 0.50 diopters. Aspherization may be outside of a circle centered at the fitting point having a radius of about 10 mm, preferably about 15 mm, more preferably about 20 mm The lenses of the invention may be constructed of any known material suitable for production of ophthalmic lenses. Such materials are either commercially available or methods for their production are known. Further, the lenses may be produced by any conventional lens fabrication technique including, without limitation, grinding, whole lens casting, molding, thermoforming, laminating, surface casting, or combinations thereof.

The invention will be clarified further by a consideration of the following, non-limiting examples.

EXAMPLES

Example 1

The convex progressive surface of a commercially available progressive lens sold under the brand name Varilux COMFORT™ having a distance curvature of 95.2 mm and an add power of 1.50 D was measured using a coordinate measuring machine to obtain its sag values. The sag values were scaled to produce a distance curvature of 94.5 mm and 0.63 D add power. The contour plots for cylinder and mean power are shown in FIGS. 1a. and 1b. The corridor length was 12.26 mm, and the maximum unwanted astigmatism was 0.63 D as shown in Table 1. The ratio of astigmatism to add power was 1.00.

Example 2

Figure 2A:
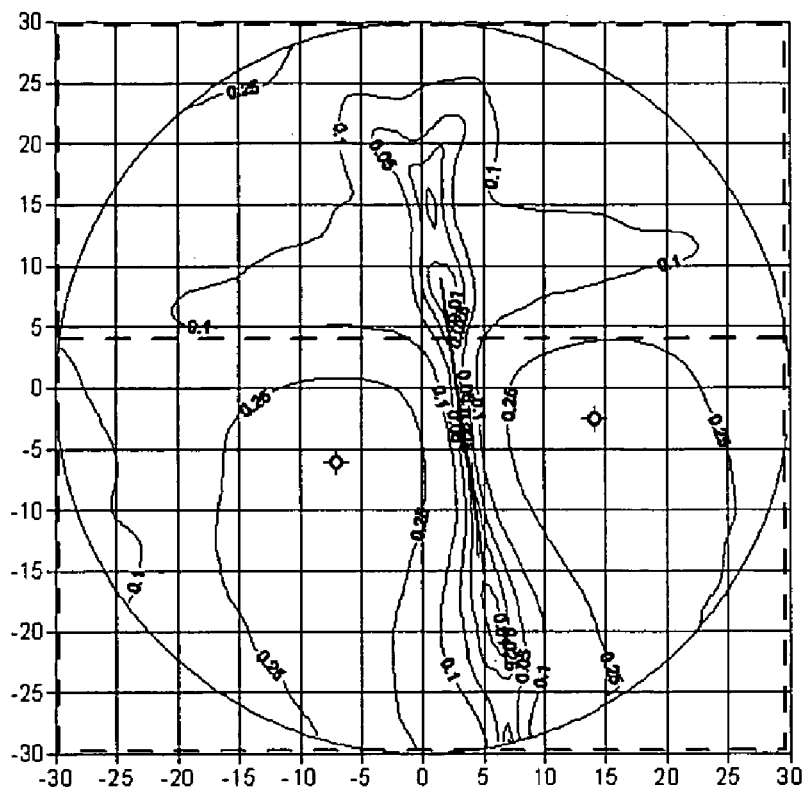
FIG. 2a is a cylinder contour map of the unwanted astigmatism of a second prior art progressive addition lens.
Figure 2B:
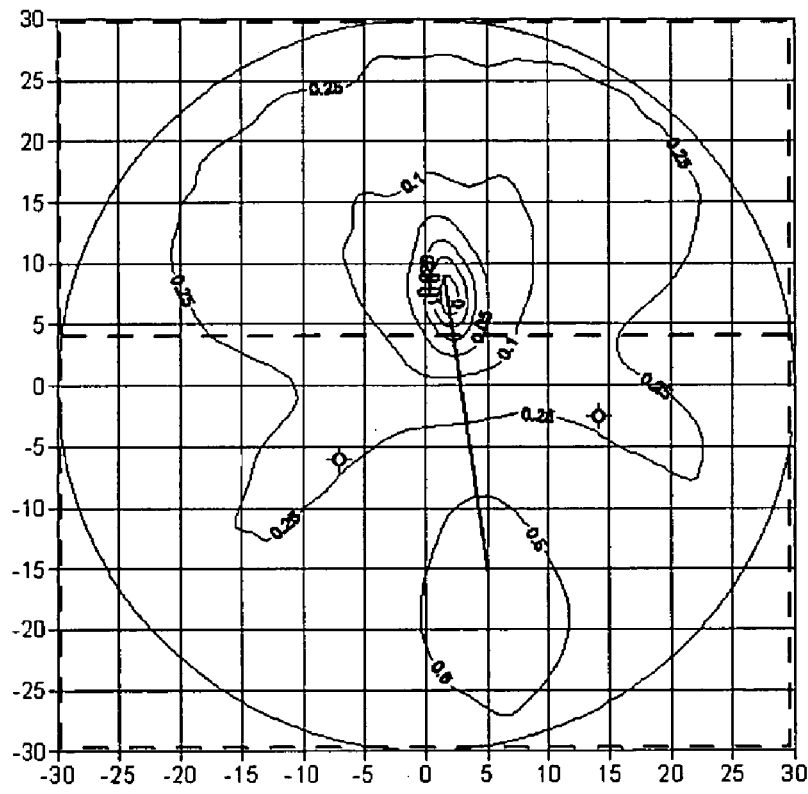

The convex and concave surfaces of a commercially available progressive lens sold under the brand name DEFINITY™ having a distance curvature 103.3 mm and an add power 1.50 D was measured using a coordinate measuring machine to obtain its sag values. The sag values were scaled to produce a distance curvature of 105.4 mm and 0.63 D add power. The contour plots for cylinder and mean power are shown in FIGS. 2a. and 2b. The corridor length was 13.09 mm, and the maximum unwanted astigmatism was 0.42 D as shown in Table 1. The ratio of astigmatism to add power was 0.67.

Example 3

A convex progressive surface was designed using a material with a refractive index of 1.498. The lens' base curve was 105.9 mm and the add power was 0.63 diopters. A two-step alteration was carried out first using a first toric alteration function and constant weighting function followed by using a second toric alteration function and weighting function with the constants listed below using Equations (I), (II), and (III):

$$A_1(x, y) = 1.30 \times A_{Toric}(x, y, 10000, 5000, 45)$$

$$W_1(x, y) = 1.00$$

and $$A_2(x, y) = -1.50 \times A_{Toric}(x, y, 10000, 5000, 90)$$

$$W_2(x, y) = W_{eight}(x, y, 0, 60, 100, 20, 0)$$

Figure 3A:
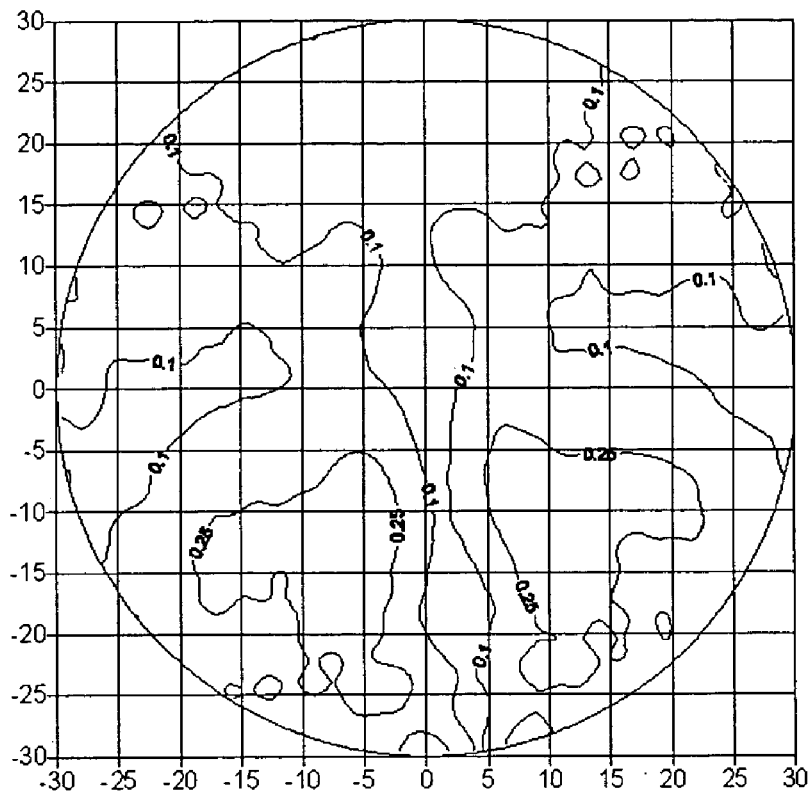
FIG. 3a is a cylinder contour map of the unwanted astigmatism of a first lens of the invention.
Figure 3B:
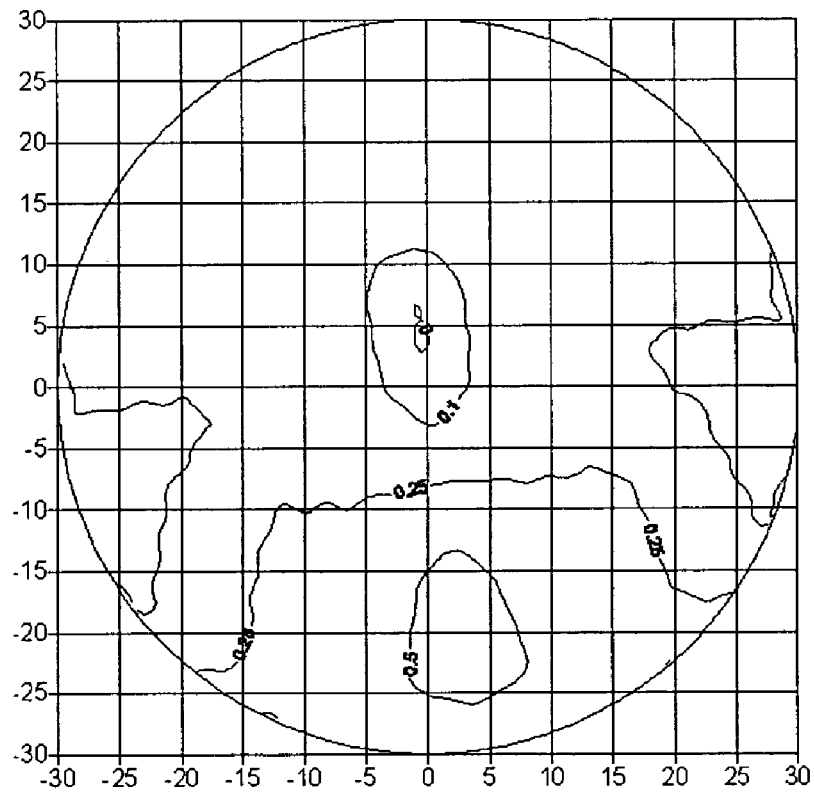

The contour plots for cylinder and mean power of the resulting non-conic, aspheric surface are shown in FIGS. 3a. and b. The corridor length was 13.57 mm, and the maximum unwanted astigmatism was 0.32 D as shown in Table 1. The ratio of astigmatism to add power was 0.51.

Example 4

A convex progressive surface was designed using a material with a refractive index of 1.498. The lens' base curve was 105.9 mm and the add power was 0.63 diopters. A toric alteration function, A and constant weighting function with the constants listed below was used to create a non-conic, aspheric surface using Equations (I), (II) and (III).

$$A(x, y) = A_{Toric}(x, y, 10000, 3000, 45)$$

$$W(x, y) = 1.00$$

Figures 4A, 4B:
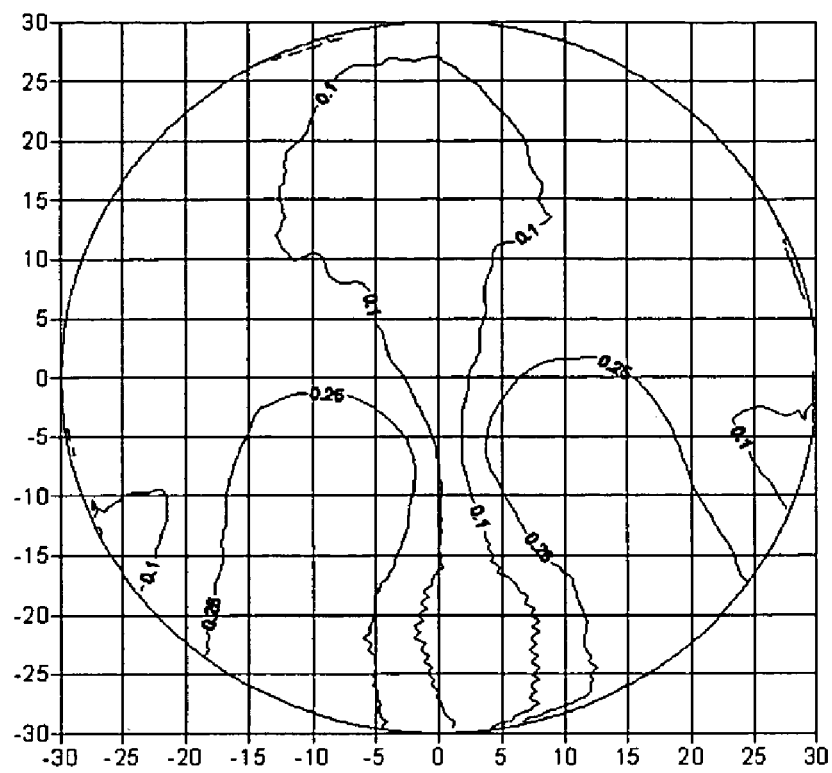

The contour plots for cylinder and mean power for the resulting non-conic, aspheric surface are shown in FIGS. 4a. and b. The corridor length was 11.99 mm, and the maximum unwanted astigmatism was 0.38D as shown in Table 1. The ratio of astigmatism to add is 0.60.

TABLE 1

| Optical Parameter | Lens 1 | Lens 2 | Lens 3 | Lens 4 |
|---|---|---|---|---|
| Add Power (D) | 0.63 | 0.63 | 0.63 | 0.63 |
| Reading Cyl. Width (mm) | 25.22 | 52.00 | 46.00 | 46.00 |
| Reading Power Width (mm) | 17.42 | 17.72 | 15.07 | 18.78 |
| Corridor Length (mm) | 12.26 | 13.09 | 13.57 | 11.99 |
| Max. Astig. (D) | 0.63 | 0.42 | 0.32 | 0.38 |
| Ratio Max Astig./Add Power | 1.00 | 0.67 | 0.51 | 0.60 |

What is claimed is:

1. A method for designing a lens, comprising the steps of:
   a.) designing a first surface that is a progressive addition surface P(x,y) using a base spherical surface $P_s$(x,y);
   b.) expressing the first surface P(x,y) as a plurality of sag values $P_o$(x,y);
   c.) altering locally one or more of the plurality of sag values $P_o$(x,y) to provide a second surface N(x,y);
   d.) adding the second surface N(x,y) to the base spherical surface $P_s$(x,y) to obtain a non-conic aspheric surface comprising an add power and having a maximum unwanted astigmatism between about 50% and 60% of the non-conic surface's add power.

2. The method of claim 1, wherein the lens is a spectacle lens.

3. The method of claim 2, further comprising e.) smoothing the non-conic, aspheric surface.

4. The method of claim 2, wherein step c.) is carried out using the equation:

$$N(x, y) = P_o(x, y) + A(x, y) \cdot W(x, y)$$

wherein A is an altering function; and
W is a weighting function.

5. The method of claim 4, wherein the weighting function is:

$$W(x, y, X_0, Y_0, \sigma_x, \sigma_y, \rho) = \mathrm{Exp}\left(-\left[\left(\frac{x-X_0}{\sigma_x}\right)^2 - 2\cdot\rho\cdot\left(\frac{x-X_0}{\sigma_x}\right)\cdot\left(\frac{y-Y_0}{\sigma_y}\right) + \left(\frac{y-Y_0}{\sigma_y}\right)^2\right] \bigg/ (2\cdot(1-\rho^2))\right)$$

wherein, $X_0$ and $Y_0$ are coordinates where a local alteration is maximal;

$\sigma_x$ and $\sigma_y$ are standard deviations of the x and y values; and $\rho$ is a correlation coefficient between x and y values.

6. The method of claim 4, wherein the altering function is one or more of $$A_{Toric}(x, y, r_1, r_2, \theta) = \sqrt{\left[\sqrt{r_2^2 - Y_0^2} + r_1 - r_2\right]^2 - X_0^2} + r_1$$

wherein $X_o = x\cdot\cos\theta - y\cdot\sin\theta$;
$Y_o = y\cdot\cos\theta - x\cdot\sin\theta$;
$r_1$ is a large radius of curvature;
$r_2$ is a small radius of curvature; and
$\theta$ is a orientation of the large axis;
or $$A_{Atoric}(x, y, r_1, r_2, \theta) = \sqrt{\left[\sqrt{r_2^2 - Y_0^2} + r_1 - r_2\right]^2 - X_0^2} + r_1 + A_1\cdot S^4 + A_2\cdot S^6 + A_3\cdot S^8 + A_4\cdot S^{10}$$

wherein $X_o = x\cdot\cos\theta - y\cdot\sin\theta$;
$Y_o = y\cdot\cos\theta - x\cdot\sin\theta$;
$r_1$ is a large radius of curvature;
$r_2$ is a small radius of curvature;
$\theta$ is a orientation of the large axis;
$A_i$ is an aspheric term; and
$S^2 = x^2 + y^2$;
or $$A_{Aspheric}(x, y) = \frac{c\cdot S^2}{1 + \sqrt{1-(K+1)\cdot c^2 \cdot S^2}} + A_1\cdot S^4 + A_2\cdot S^6 + A_3\cdot S^8 + A_4\cdot S^{10}$$

wherein c is the inverse radius of curvature;
$S^2 = x^2 + y^2$;
K is a conic constant; and
$A_i$ is an aspheric term.

7. A spectacle lens, comprising a non-conic, aspheric surface provided according to the method of claim 3.

8. A spectacle lens, comprising a non-conic, aspheric surface provided according to the method of claim 4.

9. A spectacle lens, comprising a non-conic, aspheric surface provided according to the method of claim 5.

10. A spectacle lens, comprising a non-conic, aspheric surface provided according to the method of claim 6.

11. The lens of claim 7, wherein the non-conic, aspheric surface is a convex surface.

12. The lens of claim 8, wherein the non-conic, aspheric surface is a convex surface.

13. The lens of claim 9, wherein the non-conic, aspheric surface is a convex surface.

14. The lens of claim 10, wherein the non-conic, aspheric surface is a convex surface.

15. The lens of claim 11, further comprising a concave surface comprising correction for one or more of a lens wearer's astigmatism or prism.

16. The lens of claim 15, wherein the convex surface further comprises a channel length of about 10 to about 22 mm.

17. The lens of claim 12, further comprising a concave surface comprising correction for one or more of a lens wearer's astigmatism or prism.

18. The lens of claim 17, wherein the convex surface further comprises a channel length of about 10 to about 22 mm.

19. The lens of claim 13, further comprising a concave surface comprising correction for one or more of a lens wearer's astigmatism or prism.

20. The lens of claim 19, wherein the convex surface further comprises a channel length of about 10 to about 22 mm.

21. The lens of claim 14, further comprising a concave surface comprising correction for one or more of a lens wearer's astigmatism or prism.

22. The lens of claim 21, wherein the convex surface further comprises a channel length of about 10 to about 22 mm.

* * * * *